United States Patent
Olszewski et al.

(10) Patent No.: US 7,543,161 B2
(45) Date of Patent: Jun. 2, 2009

(54) METHOD AND APPARATUS FOR TRACKING VARIABLE SPEED MICROPROCESSOR PERFORMANCE CAUSED BY POWER MANAGEMENT IN A LOGICALLY PARTITIONED DATA PROCESSING SYSTEM

(75) Inventors: Bret Ronald Olszewski, Austin, TX (US); Luc Rene Smolders, Austin, TX (US); Randal Craig Swanberg, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 487 days.

(21) Appl. No.: 10/955,182

(22) Filed: Sep. 30, 2004

(65) Prior Publication Data
US 2006/0069938 A1 Mar. 30, 2006

(51) Int. Cl.
*G06F 1/00* (2006.01)
(52) U.S. Cl. .......................................... 713/300; 702/61
(58) Field of Classification Search ................. 713/340, 713/300; 702/61; 718/102
See application file for complete search history.

(56) References Cited

U.S. PATENT DOCUMENTS

| | | | | |
|---|---|---|---|---|
| 5,761,091 A | * | 6/1998 | Agrawal et al. | 702/186 |
| 6,049,879 A | * | 4/2000 | Davis et al. | 713/300 |
| 6,970,805 B1 | * | 11/2005 | Bierma et al. | 702/182 |
| 7,131,015 B2 | * | 10/2006 | Flautner et al. | 713/320 |

* cited by examiner

*Primary Examiner*—Thomas Lee
*Assistant Examiner*—Albert Wang
(74) *Attorney, Agent, or Firm*—Yee & Associates, P.C.; Matthew W. Baca (57) ABSTRACT

A power level monitor and performance tracking tool are provided for correlating system performance with processor management events. When power management requires a change to the state of a microprocessor, software will be notified. Multiple layers of software may be notified, including a firmware level, an operating system, as well as applications. The performance tracking tool tracks the times of the power management events as well as their impact to the microprocessor performance. The performance tracking tool may then display or record the state changes to processor performance. These changes may be correlated against other system events to aid in determining system performance problems with respect to power management.

17 Claims, 4 Drawing Sheets

METHOD AND APPARATUS FOR TRACKING VARIABLE SPEED MICROPROCESSOR PERFORMANCE CAUSED BY POWER MANAGEMENT IN A LOGICALLY PARTITIONED DATA PROCESSING SYSTEM

BACKGROUND OF THE INVENTION

1. Technical Field

The present invention relates to data processing and, in particular, to microprocessor power management. Still more particularly, the present invention provides a method, apparatus, and program product for monitoring variable speed microprocessor performance caused by power management.

2. Description of Related Art

Advances in microprocessor technology are being paced by power consumption and cooling issues. Many high performance microprocessors in the future may need to be designed to automatically adapt their power consumption based on measurements of their internal state or surroundings. This implies that the performance of the microprocessor may be throttled or adapted downward in periods of high activity or environmental stress.

Today's computer systems are generally designed to supply an environment where all the microprocessors run at the same basic level of performance. In some cases, it may be possible to mix and match microprocessor types, resulting in some running at a faster speed and others running at a slower speed. In general, however, software sees a constant level of performance per processor.

With increasing emphasis on power management, software may execute in an environment where microprocessor performance within a complex system can vary dramatically from processor to processor or time period to time period. This variation may cause performance issues with the workloads of some customers. These issues may consist of such varying symptoms as run-to-run variability of processor consumption, scalability problems, and loss of external interrupts, for example.

SUMMARY OF THE INVENTION

The prior art recognizes the problems of the prior art and provides a power level monitor and performance tracking tool for correlating system performance with processor management events. When power management requires a change to the state of a microprocessor, software will be notified. Multiple layers of software may be notified, including a firmware level, an operating system, as well as applications. The performance tracking tool tracks the times of the power management events as well as their impact to the microprocessor performance. The performance tracking tool may then display or record the state changes to processor performance. These changes may be correlated against other system events to aid in determining system performance problems with respect to power management.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
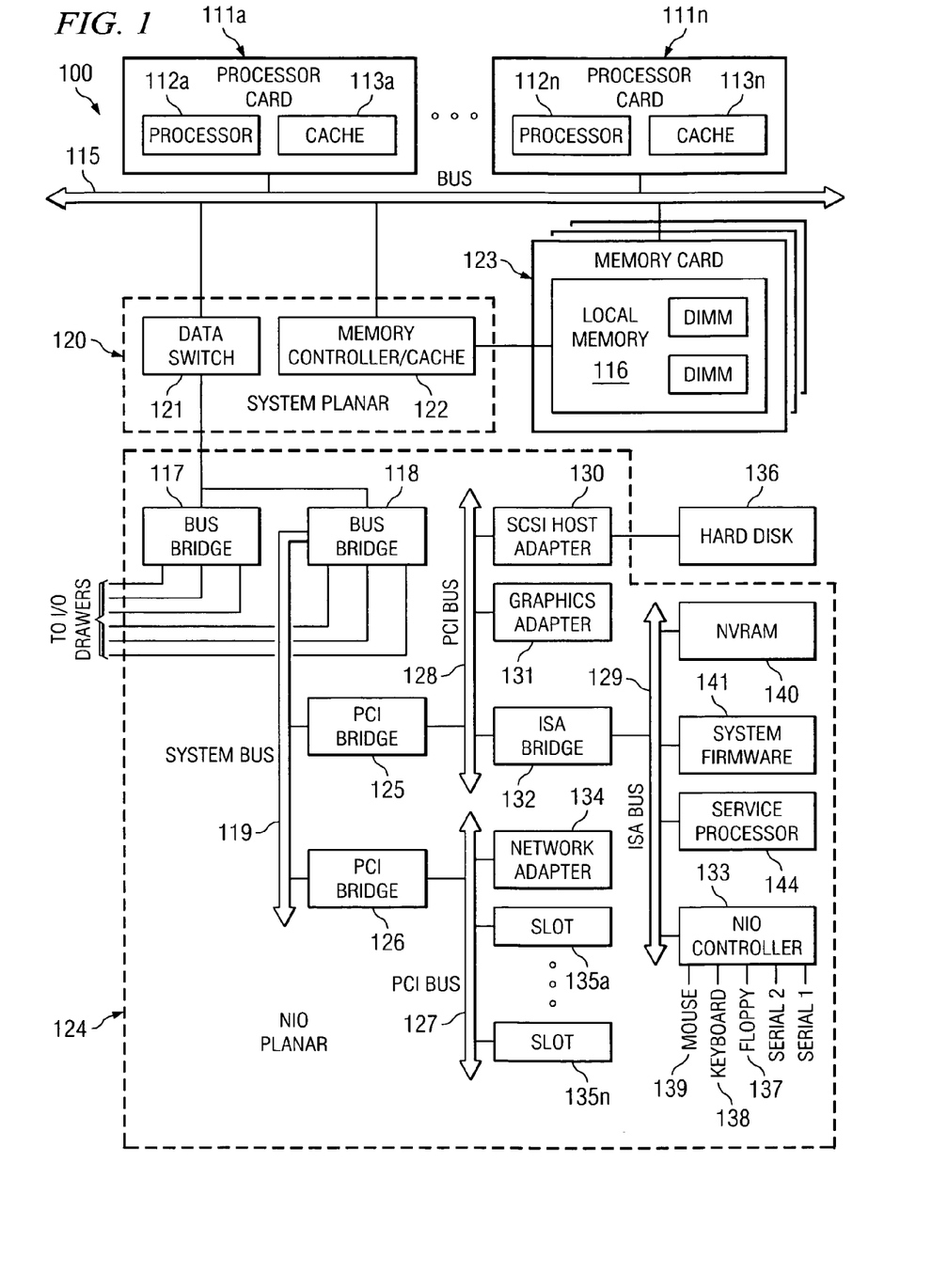
FIG. 1 is a block diagram of an illustrative embodiment of a data processing system with which the present invention may advantageously be utilized.
Figure 2:
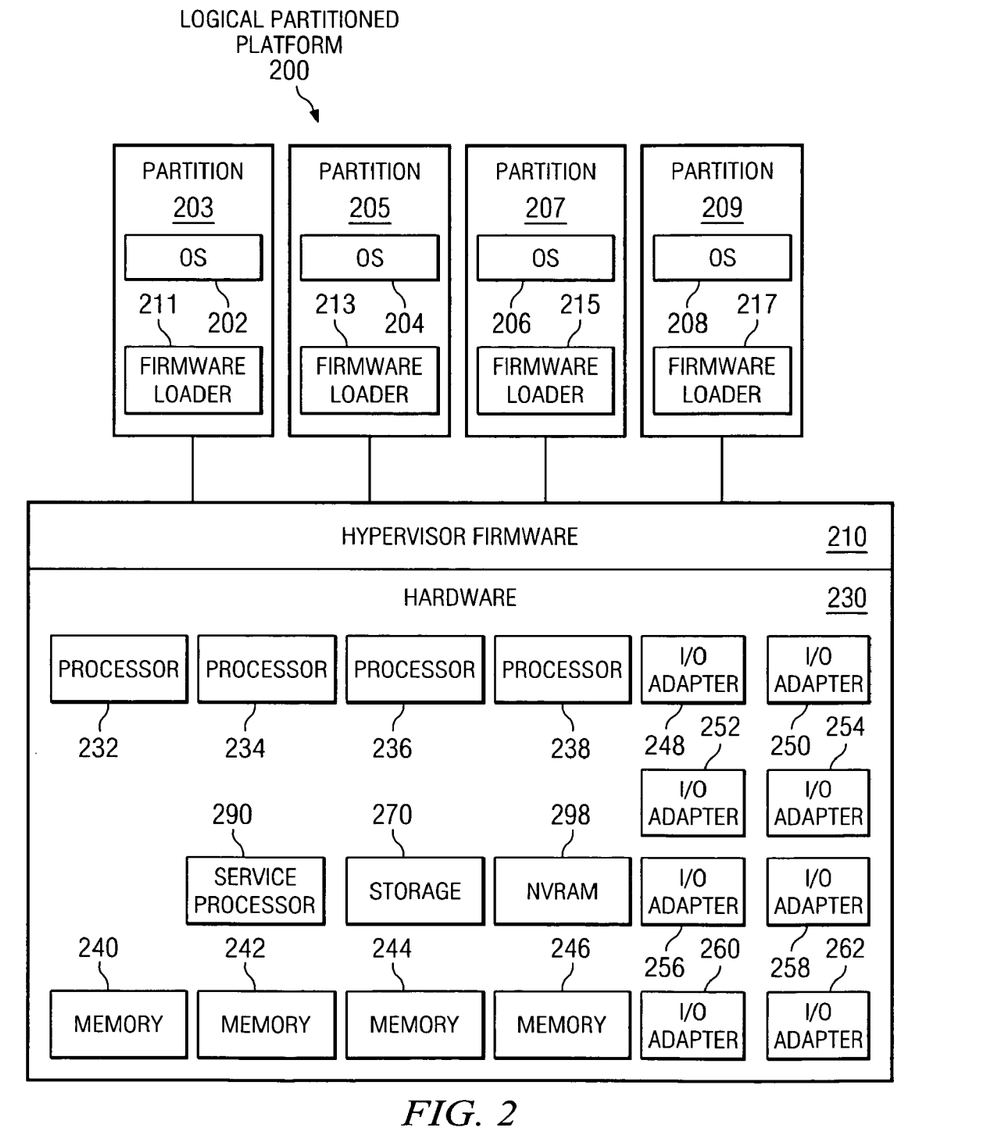
FIG. 2 is a block diagram of an exemplary logical partitioned platform in which the present invention may be implemented.
Figure 3:
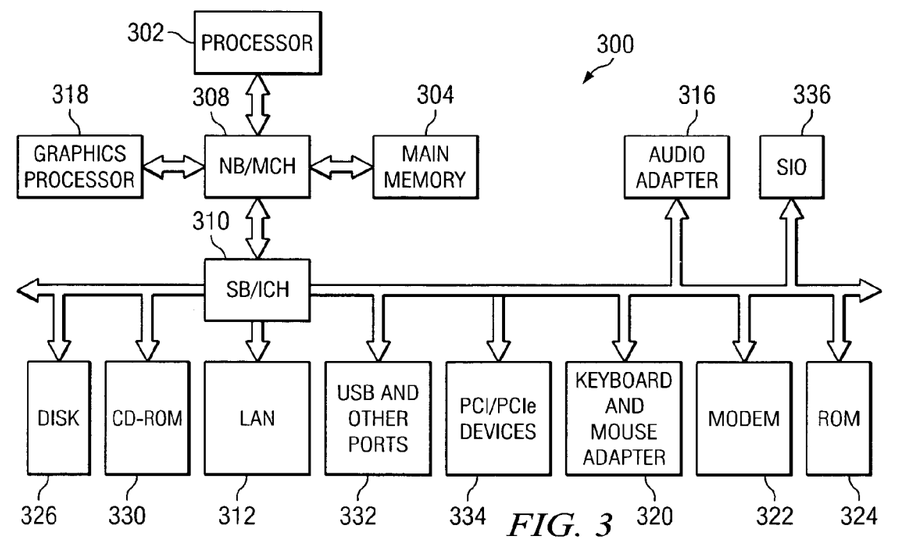
FIG. 3 is a block diagram of a single processor data processing system in which the present invention may be implemented.

The present invention provides a method, apparatus and computer program product for monitoring variable speed microprocessor performance caused by power management. The data processing device may be a single-processor computing device, a multiprocessing data processing system, or a virtual processor environment in which multiple processors and multiple layers of software may be utilized to perform various aspects of the present invention. Therefore, the following FIGS. 1-3 are provided as exemplary diagrams of data processing environments in which the present invention may be implemented. It should be appreciated that FIGS. 1-3 are only exemplary and are not intended to assert or imply any limitation with regard to the environments in which the present invention may be implemented. Many modifications to the depicted environments may be made without departing from the spirit and scope of the present invention.

Referring now to the drawings and in particular to FIG. 1, there is depicted a block diagram of an illustrative embodiment of a data processing system with which the present invention may advantageously be utilized. As shown, data processing system 100 includes processor cards 111a-111n. Each of processor cards 111a-111n includes a processor and a cache memory. For example, processor card 111a contains processor 112a and cache memory 113a, and processor card 111n contains processor 112n and cache memory 113n.

Processor cards 111a-111n are connected to main bus 115. Main bus 115 supports a system planar 120 that contains processor cards 111a-111n and memory cards 123. The system planar also contains data switch 121 and memory controller/cache 122. Memory controller/cache 122 supports memory cards 123 that include local memory 116 having multiple dual in-line memory modules (DIMMs).

Data switch 121 connects to bus bridge 117 and bus bridge 118 located within a native I/O (NIO) planar 124. As shown, bus bridge 118 connects to peripheral components interconnect (PCI) bridges 125 and 126 via system bus 119. PCI bridge 125 connects to a variety of I/O devices via PCI bus 128. As shown, hard disk 136 may be connected to PCI bus 128 via small computer system interface (SCSI) host adapter 130. A graphics adapter 131 may be directly or indirectly connected to PCI bus 128. PCI bridge 126 provides connections for external data streams through network adapter 134 and adapter card slots 135a-135n via PCI bus 127.

An industry standard architecture (ISA) bus 129 connects to PCI bus 128 via ISA bridge 132. ISA bridge 132 provides interconnection capabilities through NIO controller 133 having serial connections Serial 1 and Serial 2. A floppy drive connection 137, keyboard connection 138, and mouse connection 139 are provided by NIO controller 133 to allow data processing system 100 to accept data input from a user via a corresponding input device. In addition, non-volatile RAM (NVRAM) 140 provides a non-volatile memory for preserving certain types of data from system disruptions or system failures, such as power supply problems. A system firmware 141 is also connected to ISA bus 129 for implementing the initial Basic Input/Output System (BIOS) functions. A service processor 144 connects to ISA bus 129 to provide functionality for system diagnostics or system servicing.

An operating system (OS) may be stored on hard disk 136, which may also provide storage for additional application software for execution by data processing system. NVRAM 140 is used to store system variables and error information for field replaceable unit (FRU) isolation. During system startup, the bootstrap program loads an operating system and initiates execution of the operating system. To load the operating system, the bootstrap program first locates an operating system kernel type from hard disk 136, loads the OS into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The present invention may be executed in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN).

In accordance with a preferred embodiment of the present invention, processors 112a-112n include power management capabilities. Processors 112a-112n may adjust a power level based on environmental effects or the like. As stated above, service processor 144 may provide functionality for system diagnostics or system servicing. For example, service processor 144 may determine temperature conditions or power consumption events. Processors 112a-112n may adjust performance (speed) downward or upward in response to such events. The nature of the power adjustments could include a single lower level of performance, multiple levels of performance, or even an infinitely variable level of performance.

A monitor identifies when power management events occur and notifies a performance tracking tool of the power state. The performance tracking tool records or displays the state changes and correlates the changes against other system events to aid in determining system performance problems. The performance tracking tool may identify the other system events using a trace, for instance.

In an exemplary embodiment of the present invention, the monitor and the performance tracking tool may exist as software on top of or as part of the operating system. Alternatively, one or both of the monitor and the performance tracking tool may exist in firmware, such as system firmware 141 or service processor 144. For example, system firmware 141 may include a hypervisor that manages partitions in a logical partitioned (LPAR) data processing system.

Large symmetric multi-processor data processing systems, such as IBM eServer P690, available from International Business Machines Corporation, DHP9000 Superdome Enterprise Server, available from Hewlett-Packard Company, and the Sunfire 15K server, available from Sun Microsystems, Inc., may be partitioned and used as multiple smaller systems. These systems are often referred to as logical partitioned (LPAR) data processing systems. A logical partitioned functionality within a data processing system allows multiple copies of a single operating system or multiple heterogeneous operating systems to be simultaneously run on a single data processing system platform. A partition, within which an operating system image runs, may be assigned a non-overlapping subset of the platform's physical resources or overlapped resources managed by firmware. These platform allocable resources include one or more architecturally distinct processors with their interrupt management area, regions of system memory, and input/output (I/O) adapter bus slots. The partition's resources are represented by the platform's firmware to the operating system image.

With respect to hardware resources in a logical partitioned data processing-system, these resources are shared among various partitions. These resources may include, for example, input/output (I/O) adapters, memory modules, non-volatile random access memory (NVRAM), and hard disk drives. Each partition within an LPAR data processing system may be booted and shut down over and over without having to power-cycle the entire data processing system.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems 202, 204, 206, 208, and hypervisor 210. Operating systems 202, 204, 206, and 208 may be multiple copies of a single operating system or multiple heterogeneous operating systems simultaneously run on platform 200. These operating systems may be implemented using the OS/400, AIX, or Linux™ operating systems, which are designed to interface with a hypervisor. Operating systems 202, 204, 206, and 208 are located in partitions 203, 205, 207, and 209.

Additionally, these partitions also include firmware loaders 211, 213, 215, and 217. Firmware loaders 211, 213, 215, and 217 may be implemented using IEEE-1275 Standard Open Firmware and runtime abstraction software (RTAS), which is available from International Business Machines Corporation. When partitions 203, 205, 207, and 209 are instantiated, the hypervisor's partition manager loads a copy of the open firmware into each partition. The processors associated with or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Partitioned hardware 230 also includes service processor 290, which may be used to provide various services, such as processing of errors in the partitions or handling power management events from processors in each partition. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Hypervisor firmware 210 performs a number of functions and services for partitions 203, 205, 207, and 209 to create and enforce the partitioning of logical partitioned platform 200. Hypervisor 210 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (nonvolatile RAM). Thus, hypervisor 210 allows the simultaneous execution of independent OS images 202, 204, 206, and 208 by virtualizing all the hardware resources of logical partitioned platform 200.

According to an exemplary embodiment of the present invention, in a virtual processor environment, such as LPAR platform 200, hypervisor firmware 210 monitors the state of each microprocessor and passes the current state to each partition, also referred to as a virtual processor. Hypervisor firmware 210 may also maintain statistics per virtual processor that kept track of the number of power management events, as well as the execution time at each threshold of performance. If a microprocessor has three levels of performance (normal, reduced, super-reduced, for example), then the cycles executed in each mode may be recorded separately. If the microprocessor has a large range of performance, then recording could be by ranges.

Each of operating systems 202, 204, 206, 208 may use a trace-based approach to correlate microprocessor performance to other system events. At the time the partition is dispatched, per-virtual processor information about the current level of microprocessor performance may be made available to its corresponding operating system. The operating system then assumes this level of performance until a power management event is presented to the operating system, at which time a new state is defined. Thus, it is possible for an operating system to understand the current level of performance for any virtual processor in its instance at any time. By pushing the state into a time-stamped trace, operating system events, such as, for example, dispatching, interrupts, paging, etc., can be correlated against the current processor performance level. Hence, performance problems that occur as a result of changing performance due to power management may be identified.

In an alternative embodiment, the present invention may be applied to a single processor data processing system. FIG. 3 is a block diagram of a single processor data processing system in which the present invention may be implemented. Data processing system 300 is an example of a computer, such as client 108 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as Windows XP™, which is available from Microsoft Corporation. An object oriented programming system, such as the Java™ programming system, may run in conjunction with the operating system and provides calls to the operating system from Java™ programs or applications executing on data processing system 300. "JAVA" is a trademark of Sun Microsystems, Inc.

Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system.

For example, data processing system 300 may be a personal digital assistant (PDA), which is configured with flash memory to provide non-volatile memory for storing operating system files and/or user-generated data. The depicted example in FIG. 3 and above-described examples are not meant to imply architectural limitations. For example, data processing system 300 also may be a tablet computer, laptop computer, or telephone device in addition to taking the form of a PDA. Mobile data processing systems, such as laptop computers and the like, may include power management functionality.

In an exemplary embodiment, processor 302 is capable of automatically adjusting the power level to adapt to instantaneous changes in surroundings. When power management requires a change to the state of a processor, software is notified. For example, processor 302 may produce an interrupt to indicate a power management event. A monitor detects the power management events and provides an indication of a state change to a performance tracking tool, which tracks the times of the power management events, as well as their impact to the microprocessor performance. The performance tracking tool may then display or record the state changes to processor performance. These changes may be correlated against other system events to aid in determining system performance problems with respect to power management. The operating system or hypervisor may then use the information about variable processor performance for accounting, for example.

Figure 4:
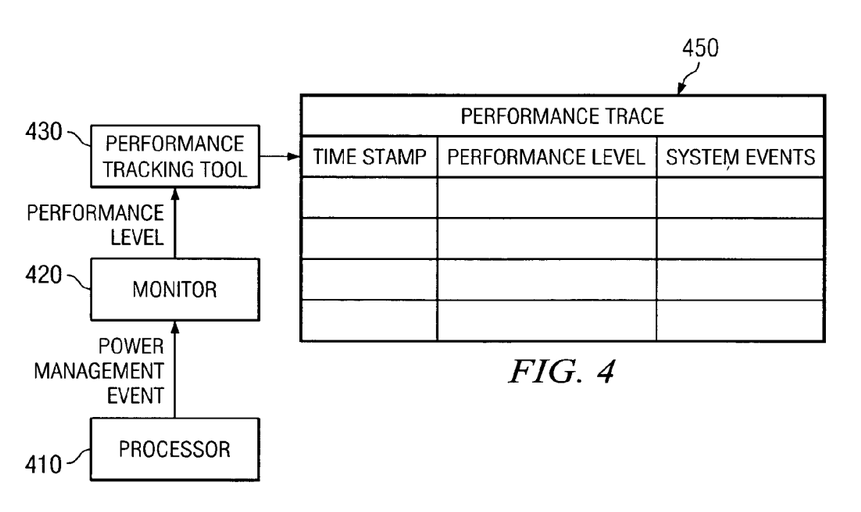
FIG. 4 is a block diagram illustrating a performance tracking system in accordance with an exemplary embodiment of the present invention.

FIG. 4 is a block diagram illustrating a performance tracking system in accordance with an exemplary embodiment of the present invention. Processor 410 generates a power management event when performance is adjusted to prevent power consumption or cooling issues. Processor 410 may generate this event by generating an interrupt, for example.

Monitor 420 receives a power management event from processor 410 and determines a performance level for processor 410. There may be a monitor for all processors in a multiple processor data processing system or, alternatively, a monitor may exist for each processor. The operating system may assume a default level of performance when processor 410 is initialized. The operating system may provide structures that contain the state, which may be extracted by performance tracking tool 430.

For each power management event, performance tracking tool 430 stores an entry in performance trace 450. An entry in performance trace 450 may include, for example, a time stamp, the performance level of the processor, and system events. Performance trace 450 may be, for example, a table, database, or other data structure. System events may include, for example, interrupts, paging, and the like. The operating system or hypervisor may keep track of statistics to include in the system events information. For example, the operating system or hypervisor may keep track of the number of cycles executed for each performance level. Performance tracking tool 430 may provide a separate performance trace for each of a plurality of processors. The performance trace illustrated in FIG. 4 is exemplary and may vary depending upon the implementation. For example, performance trace 450 may include hardware events, such as temperature measurements and the like. Performance trace 450 may also correlate performance management events for multiple processors with system events in a single trace, for example.

The operating system or hypervisor (not shown) may then use the information about variable processor performance for accounting. For example, if a customer is charged based on the amount of execution time the program takes, the charges may be scaled or weighted based on the performance the customer actually got out of the processor. As an example, consider the following equation:

$$cost = CPU\ cost * ((s1*scale1) + (s2*scale2) + (s3*scale3))$$

where CPU cost is the overall cost for CPU usage, s1 is the number of seconds the processor is in a first performance level, scale1 is a weight for the first performance level, s2 is the number of seconds the processor is in a second performance level, scale2 is a weight for the second performance level, s3 is the number of seconds the processor is in a third performance level, and scale3 is a weight for the third performance level. In this example, the first performance level may be a "normal" performance level and the weight for this performance level may be 1 or 100%. The second performance level may be a "reduced" performance level and the weight for this performance level may be ⅔ or 66%, for example. The third performance level may be a "super reduced" performance level and the weight for the third performance level may be ⅓ or 33%. Accounting based on performance tracking statistics may be performed in the operating system or, alternatively, in the hypervisor or service processor if the firmware is programmed to operate in this manner.

Monitor 420 and performance tracking tool 430 may exist in software running under control of an operating system or may be part of the operating system itself. Monitor 420 and performance tracking tool 430 may also be integrated into a single software component. Alternatively, monitor 420 and/or performance tracking tool 430 may exist in firmware or hardware. In an exemplary embodiment, in a LPAR data processing system, monitor 420 may exist in hypervisor firmware. In an alternative embodiment, monitor 420 may exist in the service processor. In a LPAR data processing system, performance tracking tool 430 may exist in hypervisor firmware or in the operating system. Thus, each instance of an operating system, i.e. a virtual processor, may have its own performance tracking tool for tracking the processor(s) it runs on.

Figure 5:
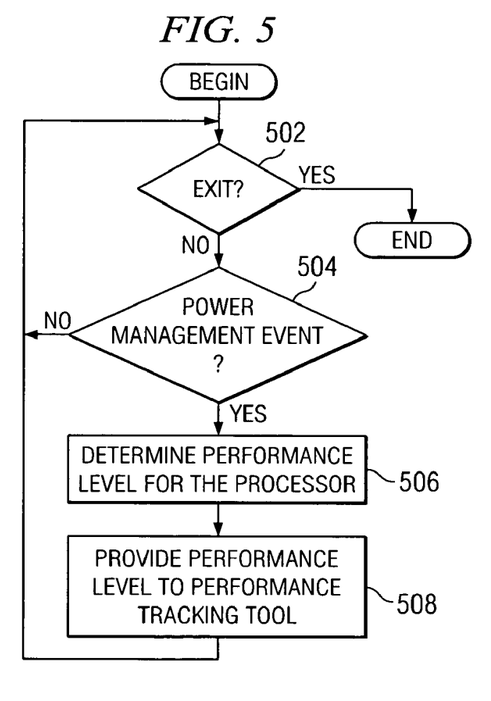
FIG. 5 is a flowchart illustrating operation of a monitor in accordance with an exemplary embodiment of the present invention.

FIG. 5 is a flowchart illustrating operation of a monitor in accordance with an exemplary embodiment of the present invention. Operation begins and the monitor determines whether an exit condition exists (block 502). An exit condition may exist, for example, when the data processing system shuts down, when the processor is no longer allocated to a given logical partition, or when the processor becomes inoperable. If an exit condition exists, operation ends.

If an exit condition does not exist in block 502, the monitor determines whether a power management event occurs (block 504). A processor may signal a power management event with an interrupt, for example. If a power management event does not occur, operation returns to block 502 to determine whether an exit condition exists. If a power management event occurs in block 504, the monitor determines a current performance level of the processor (block 506) and provides the performance level to the performance tracking tool (block 508). Next, operation returns to block 502 to determine whether an exit condition exists.

The monitor may determine the performance level by determining whether the performance level has changed since a last performance level. For example, the monitor may determine whether the performance level changes from "normal" to "reduced." More particularly, if a processor has a large range of performance levels, the monitor may determine whether the performance level changes from one range to another. For example, a processor may have one hundred discrete performance levels. In this case, the monitor may include one or more thresholds that are used to group the performance levels into ranges. Thus, a performance level between 0 and 33 may be considered super reduced, a performance level between 34 and 66 may be considered reduced, and a performance level between 67 and 100 may be considered a normal operation range. In this case, the monitor may send a performance level to the performance tracking tool for every performance level change or, alternatively, only when the performance level enters a new range.

Figure 6:
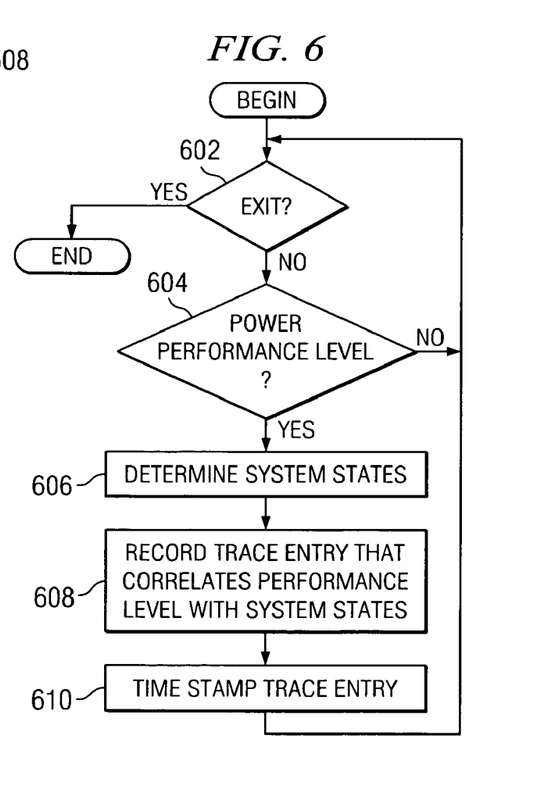
FIG. 6 is a flowchart illustrating operation of a performance tracking tool in accordance with an exemplary embodiment of the present invention.

FIG. 6 is a flowchart illustrating operation of a performance tracking tool in accordance with an exemplary embodiment of the present invention. Operation begins and the performance tracking tool determines whether an exit condition exists (block 602). An exit condition may exist when the data processing system shuts down or when a given logical partition is terminated, for example. If an exit condition exists, operation ends.

If an exit condition does not exist in block 602, the performance tracking tool determines whether a processor changes to a new performance level (block 604). This determination may be made, for example, by determining whether a new performance level is received from a monitor. The performance tracking tool may receive performance level information from more than one such monitor. If a processor does not change to a new performance level, operation returns to block 602 to determine whether an exit condition exists.

The performance tracking tool may determine whether a processor changes to a new performance level by determining whether the performance level has changed since a last performance level. For example, the performance tracking tool may determine whether the performance level changes from "normal" to "reduced." More particularly, if a processor has a large range of performance levels, the performance tracking tool may determine whether the performance level changes from one range to another. For example, a processor may have one hundred discrete performance levels. In this case, the performance tracking tool may determine whether the performance level for a processor enters a new range. Alternatively, the monitor may make this determination and signal the change to the performance tracking tool.

If a processor changes to a new performance level in block 604, then the performance tracking tool determines system states (block 606), records a trace entry that correlates the performance level with the system states (block 608), and time stamps the trace entry (block 610). Thereafter, operation returns to block 602 to determine whether an exit condition exists.

Thus, the present invention solves the disadvantages of the prior art by providing a performance trace that correlates power management events and resulting power levels with system state information. Using the performance trace, performance problems that occur as a result of changing performance due to power management can be identified. Furthermore, a hypervisor or operating system maintains statistics for each virtual processor or physical processor by keeping track of the number of power management events, as well as the execution time at each threshold of performance. If a microprocessor has three levels of performance, the cycles executed or other statistics in each mode may be recorded separately. If the microprocessor has a large range of performance, the recording could be by ranges.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of media actually used to carry out the distribution. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for tracking performance changes due to power management in a plurality of logical partitions of a data processing system having the plurality of logical partitions executing on one or more processors managed by a hypervisor, the method comprising:
   using a hypervisor, monitoring for a power management event in a first logical partition executing in a first processor;
   using the hypervisor, determining whether execution of the first logical partition on the first processor changes from a first performance level to a second performance level in response to the power management event; and
   using the hypervisor and responsive to the power management event, determining whether execution of a second logical partition executing on the first processor changes from a third performance level to a fourth performance level in response to the power management event;
   using the hypervisor, recording a first performance trace for the first logical partition that correlates a first change from the first performance level to the second performance level with a system state information when the first processor changes from the first performance state to the second performance state to the new performance level;
   using the hypervisor, recording a second performance trace for the second logical partition that correlates a second change from the third performance level to the fourth performance level with the system state information when the first processor changes from the third performance level to the fourth performance level.

2. The method of claim 1, wherein monitoring for a power management event includes detecting an interrupt from the first processor.

3. The method of claim 1, wherein recording a first performance trace includes creating a trace entry for the power management event and time stamping the trace entry.

4. The method of claim 1, wherein an operating system runs on the first logical partition and wherein the step of recording the first performance trace is performed by the operating system.

5. The method of claim 4, wherein the step of monitoring for a power management event is performed by the operating system.

6. The method of claim 1, wherein the data processing system is a multiple processor system.

7. The method of claim 6, further comprising:
   monitoring for a power management event in a second processor; and
   recording a third performance trace entry for the power management event in the second processor.

8. The method of claim 7, wherein the step of recording a third performance trace is performed by an operating system run on the second processor.

9. The method of claim 1, further comprising:
   charging a customer based on the amount of execution time the program takes, wherein the charge is scaled or weighted based on a performance the customer actually receives from the processor.

10. The method of claim 1 further comprising:
    using the hypervisor, calculating a cost for an execution of the first logical partition on the first processor and the second logical partition on the first processor by calculating a first value and a second value, adding the first value and the second value to get a third value, and multiplying the third value by an overall cost for a central processor usage;
    wherein the first value is calculated by multiplying a first number of seconds that the first processor is in a first performance level times a first weight for the first performance level, and the second value is calculated by multiplying a second number of seconds that the first processor is in a second performance level times a second weight for the second performance level.

11. An apparatus for tracking performance changes due to power management in a plurality of logical partitions of a data processing system having the plurality of logical partitions executing on one or more processors managed by a hypervisor, the apparatus comprising:
    using a hypervisor, means for monitoring for a power management event in a first logical partition executing in a first processor;
    using the hypervisor, means for determining whether execution of the first logical partition on the first processor changes from a first performance level to a second performance level in response to the power management event; and
    using the hypervisor and responsive to the power management event, means for determining whether execution of a second logical partition executing on the first processor changes from a third performance level to a fourth performance level in response to the power management event;

using the hypervisor, means for recording a first performance trace for the first logical partition that correlates a first change from the first performance level to the second performance level with a system state information when the first processor changes from the first performance state to the second performance state to the new performance level;

using the hypervisor, means for recording a second performance trace for the second logical partition that correlates a second change from the third performance level to the fourth performance level with the system state information when the first processor changes from the third performance level to the fourth performance level.

12. The apparatus of claim 11, wherein the means for monitoring for a power management event includes means for detecting an interrupt from the first processor.

13. The apparatus of claim 11, wherein the means for recording a first performance trace includes means for creating a trace entry for the power management event and means for time stamping the trace entry.

14. The apparatus of claim 11, wherein the data processing system is a multiple processor system.

15. The apparatus of claim 14, comprising:

means for monitoring for a power management event in a second processor; and means for recording a third performance trace entry for the power management event in the second processor.

16. The apparatus of claim 11, further comprising means for determining a cost for computer usage based upon the first performance trace and the second performance trace.

17. A recordable-type medium containing a computer program product for tracking performance changes due to power management in a plurality of logical partitions of a data processing system having the plurality of logical partitions executing on one or more processors managed by a hypervisor, the computer program product comprising:

instructions for, using a hypervisor, monitoring for a power management event in a first logical partition executing in a first processor;

instructions for, using the hypervisor, determining whether execution of the first logical partition on the first processor changes from a first performance level to a second performance level in response to the power management event; and instructions for, using the hypervisor and responsive to the power management event, determining whether execution of a second logical partition executing on the first processor changes from a third performance level to a fourth performance level in response to the power management event;

instructions for, using the hypervisor, recording a first performance trace for the first logical partition that correlates a first change from the first performance level to the second performance level with a system state information when the first processor changes from the first performance state to the second performance state to the new performance level;

instructions for, using the hypervisor, recording a second performance trace for the second logical partition that correlates a second change from the third performance level to the fourth performance level with the system state information when the first processor changes from the third performance level to the fourth performance level.

* * * * *